United States Patent

[11] 3,589,650

| [72] | Inventors | Sixten Einar Carlsson;<br>Lars-ake Erling Svensson; Bjorn Sture Wiklund, all of Norrkoping, Sweden |
|---|---|---|
| [21] | Appl. No. | 804,488 |
| [22] | Filed | Mar. 5, 1969 |
| [45] | Patented | June 29, 1971 |
| [73] | Assignee | Boigs Fabriks Aktiebolag<br>Norrkoping, Sweden |
| [32] | Priority | Mar. 7, 1969 |
| [33] | | Sweden |
| [31] | | 3001/68 |

[54] ARRESTING DEVICE FOR AIRCRAFT
3 Claims, 6 Drawing Figs.

| [52] | U.S. Cl. | 244/110 |
|---|---|---|
| [51] | Int. Cl. | B64f 1/02 |
| [50] | Field of Search | 244/110 |

[56] References Cited
UNITED STATES PATENTS

| 2,987,278 | 6/1961 | Hoffman et al. | 244/110 |
|---|---|---|---|
| 3,123,325 | 3/1964 | Stephens | 244/110 |
| 3,469,808 | 9/1969 | D'Aulerio | 244/110 |

*Primary Examiner*—Milton Buchler
*Assistant Examiner*—Paul E. Sauberer
*Attorney*—Eric Y. Munson ABSTRACT: An arresting device for the braking of aircraft or other vehicles by means of an arrester device embodying a cable, net etc., connected to braking means, and which means includes a brake that has a brake drum that is caused to rotate before and during contact of the cable or net with the airplane, the rotation means for the brake drum being power means such as one or more electric motors, the speed of the power means and hence the rotative speed of the drum being controlled to cause it to correspond to the approach speed of a plane to be arrested so that the jerk on the cable during the arresting operation will be minimized.

PATENTED JUN 29 1971
3,589,650
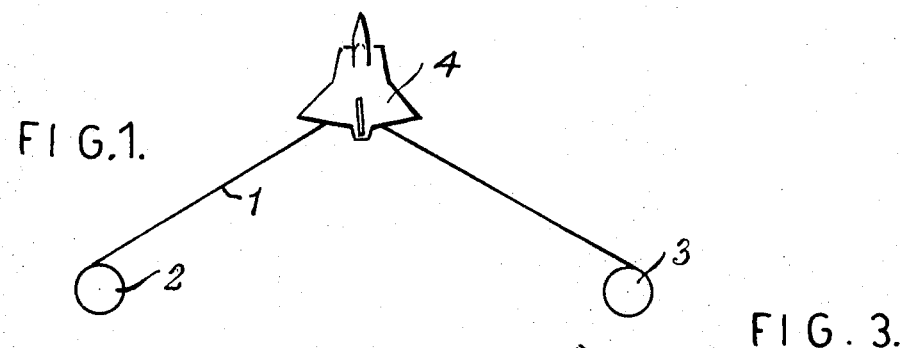
FIG.1.
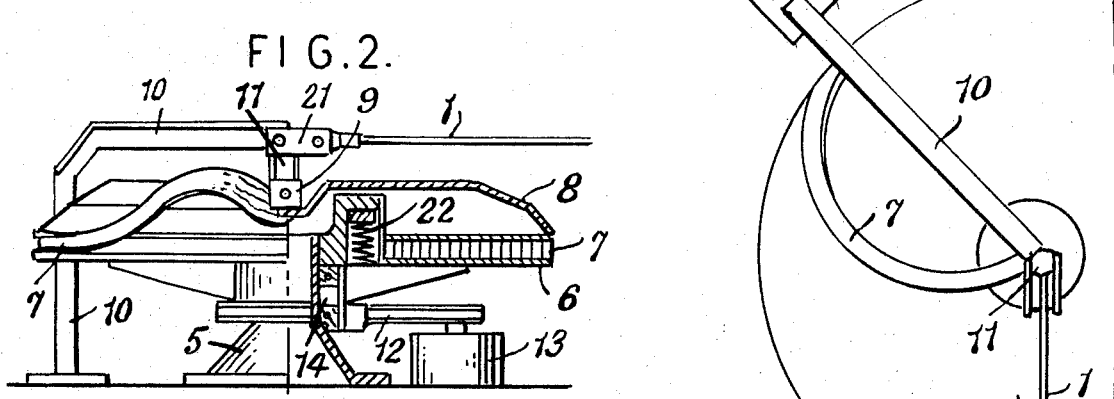
FIG.2.
FIG.3.
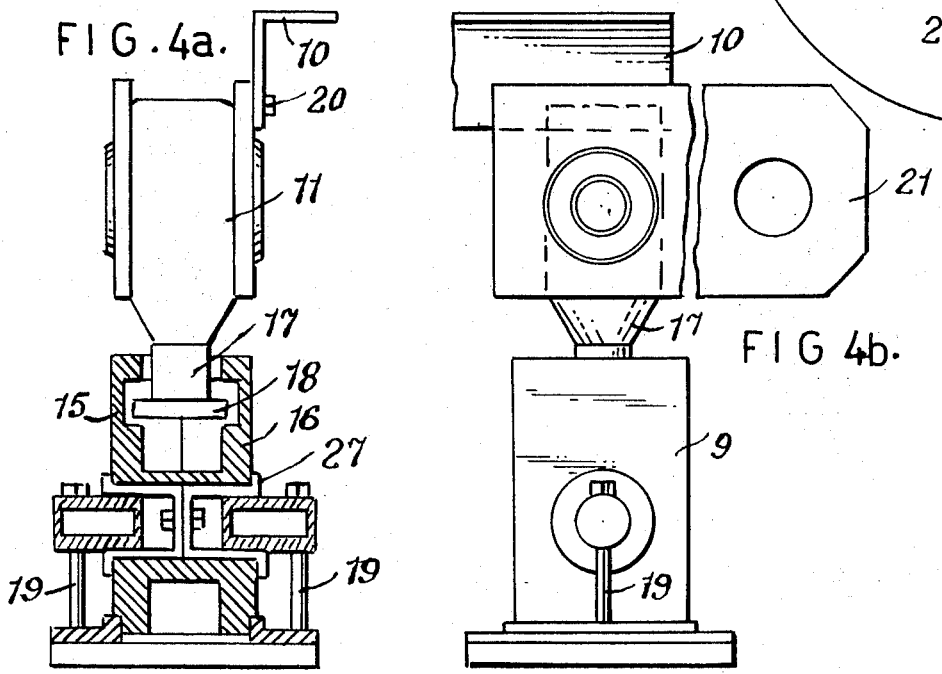
FIG.4a.
FIG 4b.
FIG.5.
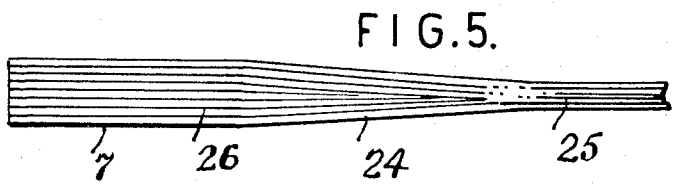
INVENTOR.
Sixten Einar Carlsson
Lars-Ake Erling Svensson
Björn Sture Wiklund
By Eric Y. Hanson
Attorney

ARRESTING DEVICE FOR AIRCRAFT

This invention relates to a device principally intended for the braking of airplanes by means of an arrester such as a net, a hook cable etc. which is connected to arrester cables arranged in such a manner that they unwind themselves from brake drums connected to brakes. When an airplane is arrested, the drums are caused to rotate at high speed. This gives rise to very high acceleration forces since the drum must accelerate to the speed at which the peripheral velocity will be proportional to the speed of the arrested airplane. Efforts have been made to design brakes and cable drums in such a manner that they are as light as possible, in order to maintain the acceleration forces at a reasonable level. However only limited improvement can be obtained in this manner since the weight of the 200—300 m. long cable or band represents a substantial mass which cannot be markedly reduced. Regardless of the design of the drum, each type has a velocity beyond the limits of which the acceleration forces will be excessively high. Heavier dimensions offer no solution since the masses increase correspondingly.

A further problem is encountered since it is desirable to shorten, as much as possible, the takeoff and landing runways in order to reduce costs and enable the building of runways to be carried out in a short space of time. This may be achieved by means of arresting devices for all airplanes landing on the runway and for this purpose the arrester equipment must have high repeatability, that is, it must be possible to prepare the device in a short space of time for a repeat operation after it has been operated.

Furthermore, it is desirable that the device shall be located in such a manner that the arresting process shall start as soon as the plane has touched down on the landing strip, that is, when the speed of the airplane is very high. The same device must be capable of arresting airplanes of different types and weights, moving at varying speeds.

In order to obtain an arresting device which meets the above requirements, one of the known solutions is to store the arrester cable in such a manner that when an airplane is arrested, the cable is unwound at a gradual rate of acceleration of each part of the cable. Simultaneously, braking takes place by means of two brake pads or by only one part of the cable being wound around the brake drum. The disadvantage of this method is that excessive time is required to prepare the device for repeated operation, that is, the repeatability is poor.

The above problems are solved by an arrester device constructed in accordance with this invention, which is principally characterized by the fact that the brake drum is caused to rotate by means of a motor or similar device before and at the moment when the airplane comes into contact with the arrester device. The speed of rotation of the brake drum is adjusted to correspond to the speed of approach of the airplane so that the initial jerk on arresting is kept at a minimum. In this manner, the device obtained is such that it can arrest airplanes of practically any size; has a repeatability that is highly satisfactory and is adaptable to different types of airplanes.

In the accompanying drawing, wherein an illustrative embodiment of the invention is disclosed, FIG. 1 is a schematic plan view of the arrester arrangement;

FIG. 2 is a side elevation of a braking means in accordance with the invention, one part of the figure being shown in section;

FIG. 3 is a plan view of the brake;

FIGS. 4$^a$ and 4$^b$ are two different side elevations of a coupling; and

FIG. 5 shows a portion of a flat cable.

In FIG. 1 the arrester cable is designated at 1 and is arranged between the two brakes 2 and 3. The airplane which is fitted with a hook, is shown at 4 and is shown at the point where it has just been engaged by the cable 1. As an alternative for the cable, a net or similar device may be used.

The brake constructed in accordance with FIGS. 2 and 3, consists of a central vertical stand 5 which supports a rotating brake drum 6 around which a flat cable 7 is wound. The drum 6 is provided with a cover 8, which at its center supports a coupling consisting of a rotating component 9 which is fixed to the cover 8 and which will hereinafter by referred to as the rotor, and a stationary part 11 which is fixed to the stator 10 and which will be hereinafter referred to as the stator. The flat cable 7 is fixed to the rotor and the cable 1 is fixed to the stator.

The drum 6 is driven by means of a V-belt 12 from a motor 13. A ball or roller bearing is designated at 14.

The rotor 9 consists of two half-cylinders 15, 16 which are joined together and enclose a stub axle 17 on the stator 10. The stub axle is provided with a flange 18. The axle and flange are free to rotate in the half-cylinders 15, 16 but the rotor and stator are axially fixed in relation to each other since the opening for the axle 17 is radially smaller than the flange. The half-cylinders are joined together by component 27 to which the flat cable 7 is attached. The rotor is attached to the cover 8 by means of shear studs 19 whereas the stator is attached to the stand 10 by means of shear studs 20. The cable 1 is attached to the rotor by means of a pivoted link 21.

A brake 22 is fitted between the stand 5 and the drum 6. The brake can be of the friction type and exerts a braking effort on the drum when the cable is unwound while arresting an airplane.

Before an airplane is arrested, the drum 6 and the cable wound on the drum, are caused to rotate by means of a motor 13 at a suitable speed which is somewhat lower than the approach speed of the airplane. This also causes the motor 9 to rotate. When the cable 1 becomes attached to the airplane, a load is applied by the cable or net in the direction of the arrow 23 (FIG. 3). As a result, first the studs 20 and immediately afterward the studs 19 are sheared off. The coupling is consequently freed from the stand 5 as well as the cover 8 and braking of the airplane is initiated.

As shown in FIG. 2, the cable 7 lies diagonally towards the rotor 9 over the domed cover and consequently the throw-off sequence is highly favorable without risk of kinking, even if at the moment of arresting the airplane the rotor should be in the least favorable position for unwinding the cable. The cable is thrown outwardly by centrifugal force and due to the axial distance between the rotor and the cable storage, the cable can twist without kinking.

The drawing shows a cable drum with a vertical axis although a horizontal location can also be employed. A different form of brake such as a liquid brake can be used instead of the friction brake illustrated.

In order to rotate the brake drum at a speed suitable for the approach speed of the airplane, a monitoring device is installed at a suitable distance before the arrester device. The monitoring device sends a radar signal when the airplane passes. At a given speed of the airplane a certain period of time will elapse during which the airplane travels from the monitoring device to the arrester device. If the speed of the airplane is lower, the time elapsed will be longer. Since a small braking effort is applied when the airplane passes the monitoring device, at the lower speed of the airplane as mentioned above, this braking effort will be applied during a longer period and thus the drum will rotate at a lower speed to suit the speed of the airplane. For this initial braking the arrester device may be fitted with a separate, small secondary brake which adjusts the speed of the drum and a larger brake for arresting the airplane. Furthermore, in addition to the small driving motor which maintains the rotation of the drum, a larger motor can be provided by means of which the cable can be wound back onto the drum.

In FIG. 5 is shown a flat cable 7 of rectangular cross-sectional shape which changes into a circular cable 25 along the transition length 24. The fibers or strands of the cable are shown at 26. The transition length of the flat cable is intended to form the loop which rests over the domed cover and runs to the coupling in the center of the cover.

This invention completely opens new perspectives in the arresting of airplanes during landing. There are practically no limits as far as the approach speed is concerned. Runways may be made appreciably shorted and a permanent installation can be made for example on a 500 m. runway. Takeoff may be assisted by means of rockets. If a further strip of 300—400 m. is cleared, conventional emergency arresters fitted to quick-rising masts may be employed as a complement.

We claim:

1. A device for the braking of vehicles such as airplanes, by means of an arrester such as a net, hook, cable, or the like connected to arrester cables which during braking are arranged to unwind from brake drums connected to brakes, the device including a brake drum that is caused to rotate before and during contact of the net, cable etc. with the airplane, power means for rotating the brake drum at a speed corresponding to the approach speed of the airplane so that the least possible jerk is applied to the arrester device, a cable of rectangular cross section being wound around the brake drum that is connected to the arrester device by means of a coupling, such coupling being coaxial with and located at one end of the drum and consisting of a component which is connected to a cable and is rotatably mounted in and axially fixed to a stationary component that is fixed to the arrester device.

2. A device according to claim 1, characterized in that the coupling is located axially outside and some distance away from the adjacent coil of cable.

3. A device for the braking of vehicles preferably airplanes by an arresting device such as a net, hook, cable or the like which are adapted to unwind from brake drums, characterized by a cable which is wound around a brake drum and which cable is flat and is connected to an arrester cable, the brake drum before and upon contact between the aircraft and the arresting cable being arranged to rotate by means of a motor with a speed adjusted to the landing speed of the aircraft in order to reduce the shock on the arresting cable.